United States Patent [19]

Kloeber et al.

[11] 4,317,219
[45] Feb. 23, 1982

[54] MOBILE RADIO SYSTEM

[75] Inventors: Peter Kloeber; Heinz Schroeter, both of Munich, Fed. Rep. of Germany

[73] Assignee: Siemens Aktiengesellschaft, Berlin & Munich, Fed. Rep. of Germany

[21] Appl. No.: 167,061

[22] Filed: Jul. 9, 1980

[30] Foreign Application Priority Data

Jul. 31, 1979 [DE] Fed. Rep. of Germany ....... 2931084

[51] Int. Cl.$^3$ .......................... H04B 3/60; H04B 7/26
[52] U.S. Cl. ........................................ 455/56; 340/47; 375/36; 455/14
[58] Field of Search ........................ 455/14, 18, 41, 49, 455/50, 51, 53, 54, 55, 56, 63; 340/47; 375/36

[56] References Cited

U.S. PATENT DOCUMENTS

| | | | |
|---|---|---|---|
| 2,597,818 | 5/1952 | Preston | 455/56 |
| 3,714,574 | 1/1973 | Baba et al. | 455/54 |
| 4,006,315 | 2/1977 | Halstead | 455/41 |
| 4,092,600 | 5/1978 | Zimmermann et al. | 455/54 |
| 4,209,749 | 6/1980 | Kloeber et al. | 455/56 |

FOREIGN PATENT DOCUMENTS 2644206  4/1978  Fed. Rep. of Germany ........ 455/56

Primary Examiner—Marc E. Bookbinder
Attorney, Agent, or Firm—Hill, Van Santen, Steadman, Chiara & Simpson

[57] ABSTRACT

A radio system for communications transmission between transmitting/receiving stations moving along prescribed routes and stationary transmitting/receiving stations arranged along these routes at prescribed intervals and effective in both route directions, provides that the stationary stations of one route are connected by way of cable to a central transmitting/receiving station. A carrier signal generator is connected to that end of the cable which is farthest from the central transmitting/receiving station and an amplitude modulator is connected parallel at the locations along the cable provided for the input of signals and formed by the stationary transmitting/receiving stations, and are respectively connected by way of a transformer having a high transmission ratio. A demodulator having a threshold value circuit is inserted in the central transmitting/receiving station at the end of the cable. The radio system is of particular advantage in railway radio.

7 Claims, 3 Drawing Figures

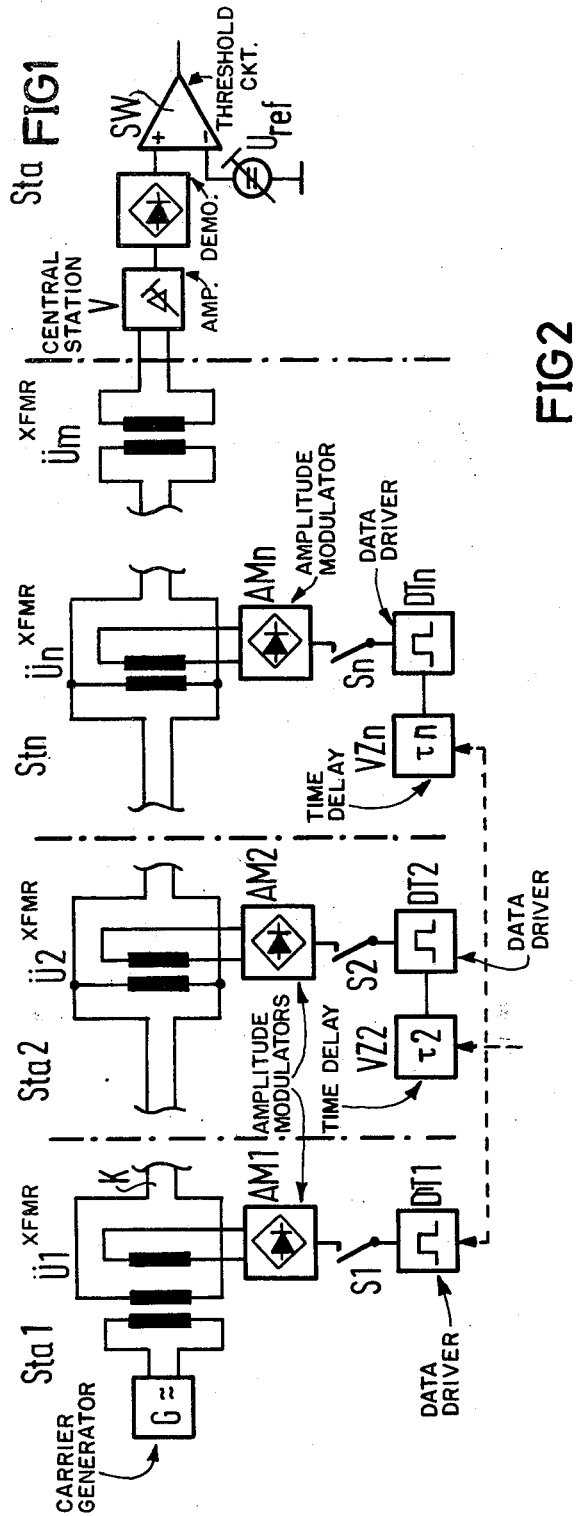

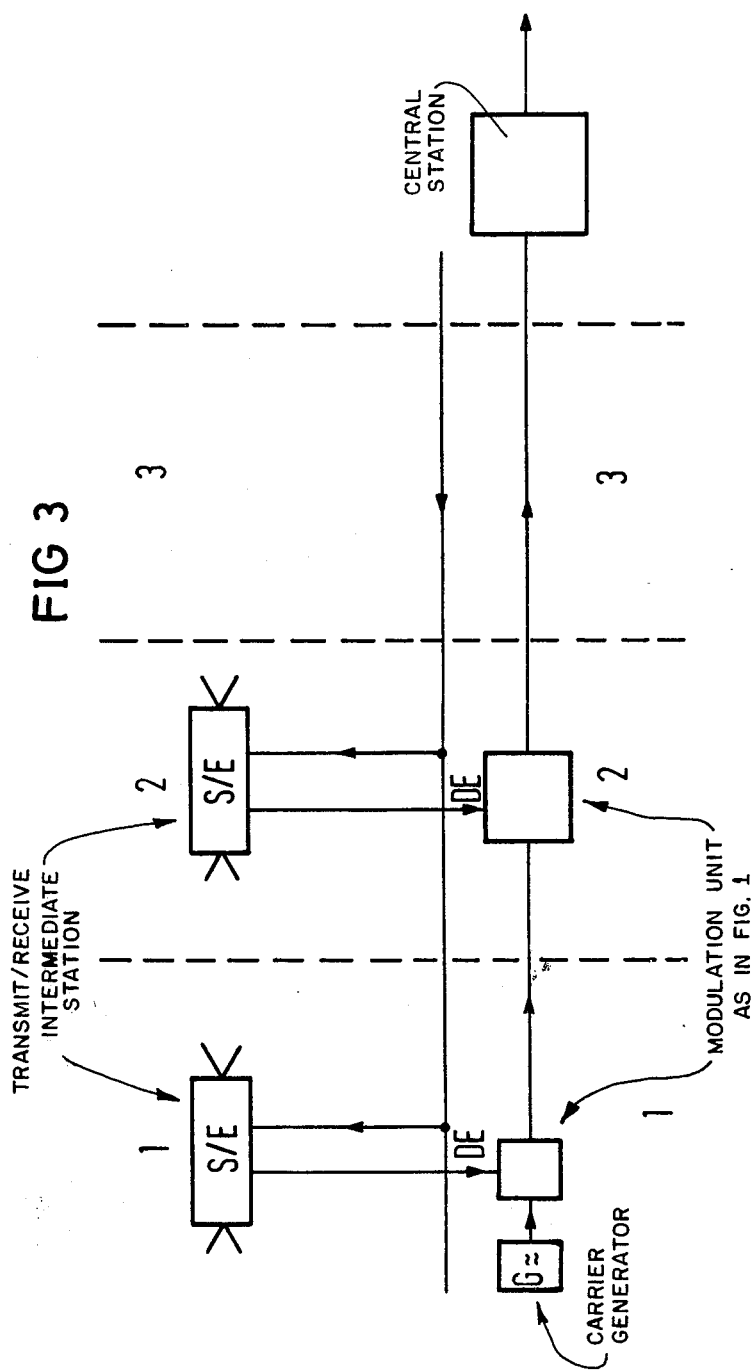

MOBILE RADIO SYSTEM

BACKGROUND OF THE INVENTION

1. Field of the Invention

The present invention relates to a radio system for communications transmission between transmitting/receiving stations moving along prescribed routes and stationary to transmitting/receiving stations effective in both route directions arranged along the routes at prescribed intervals, and more particularly to such a system in which the stationary stations of one route are connected by way of a cable to a central transmitting/receiving station.

2. Description of the Prior Art

Such a radio system is known, in general, from the German published application No. 26 44 206. The stationary transmitting/receiving stations are collected in transmitting sections within which all transmitting/receiving stations respectively transmit on the same frequency and, in case of full duplex traffic, receive on a different frequency.

Generally speaking, the communications transmitted from the moving transmitting/receiving station is received by a plurality of stationary transmitting/receiving stations. Therefore, it is advantageously provided that the communication which is best in terms of level is transmitted to the central transmitting/receiving station or, respectively, is evaluated thereby, or that, given a superimposition of the individual communication signals, the various transmitting/receiving stations which are connected together with only one line to the central transmitting/receiving station, distortions of the sum communication signal in the central transmitting/receiving station are kept as small as possible. Such distortions, for example, can occur as phase errors due to differing signal transit times on the cable or can occur in the amplitude due to the accident-like addition of the signals of the transmitting/receiving stations just now receiving the communication.

SUMMARY OF THE INVENTION

The object of the invention is to provide a solution for a distortion-free, accurate communication transmission, particularly of binary data, from the individual transmitting/receiving stations to the central transmitting/receiving station in a simple manner.

Given a radio system of the type generally mentioned above, this object is achieved, according to the present invention, in such a manner that a carrier signal generator is connected to the end of the cable which is farthest from the central transmitting/receiving station and an amplitude modulator is connected parallel to the locations along the cable provided for the input of signals (communications) and formed by the stationary transmitting/receiving stations, being connected to these locations by way of a respective transformer, and in that a demodulator having a threshold value circuit and, if necessary, an amplifier preconnected to the modulator is inserted at the end of the cable in the central transmitting/receiving station.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic diagram of the devices for the communication transmission on the cable;

FIG. 2 is a schematic circuit diagram of a modulator and a transformer in the area of a transmitting/receiving station; and FIG. 3 is a schematic illustration of a radio system having the devices for the communication transmission.

DESCRIPTION OF THE PREFERRED EMBODIMENTS

As shown in FIG. 1, between the dot-dash lines, are the cable sections in the area of the individual, stationary transmitting/receiving stations Sta1, Sta2 . . . Stan and the appertaining modulation devices for the cable transmission of data from a plurality of randomly disconnectible stations having identical information lying in series to a central station. Each stationary station, i.e., each possible input location for a binary communication to be transmitted to the central transmitting/receiving station, contains an amplitude modulator AM1, AM2 . . . AMn which are respectively connected parallel to the cable K by way of a respective coupler (here in the form of a transformer) Ü1, Ü2 . . . Ün having a high transmission ratio (ü≧5). At that end of the cable K lying farthest from the central transmitting/receiving station, therefore, in the first stationary transmitting/receiving station Sta1, a carrier frequency generator G is coupled in and generates the required carrier frequency for the communication transmission.

Depending upon whether the individual stationary transmitting/receiving stations are receiving or not, the amplitude modulators AM1, AM2 . . . AMn are driven by respective data drivers DT1, DT2 . . . DTn which are connected thereto by means of respective switches S1, S2 . . . Sn, symbolically illustrated. Respective time delay devices VZ2 . . . VZn having different delay times τ2 . . . τn are connected between the data drivers, beginning with the second station, and the common data input, illustrated by broken lines. Those transmitting/receiving stations which are close to the central transmitting/receiving station delay their signals more than those which lie at a greater distance. In this manner, the different transit times of the communication signals on the cable between the individual stationary transmitting/receiving stations Sta1, Sta2 . . . Stan, whose data inputs are connected in parallel, and the central transmitting/receiving station are equalized at the individual transmitting/receiving stations.

A signal of a mobile transmitting/receiving station which is received time-offset by the individual stationary transmitting/receiving stations arrives simultaneously at the central transmitting/receiving station by way of the cable from the individual stationary transmitting/receiving stations.

In the central transmitting/receiving station, at whose input a transformer Üm is connected to the cable, an amplifier V, a demodulator Dem and a threshold value circuit SW are connected in series. The threshold value circuit SW has two inputs, of which one is connected to the output of the demodulator Dem and the other is connected to a reference voltage source Uref. The output of the threshold value circuit SW forms the data output of the transmission path.

FIG. 2 illustrates the circuit diagram of a modulator and its connection to the transmission path. The modulator is constructed as a bridge circuit having four diodes D1, D2, D3 and D4. The binary data are applied to the terminals of the one diagonal whose intervening branches contain the diodes D1 and D2 or, respectively, D3 and D4 having identical poling and connected in series. The secondary winding of a transformer Ü is connected in the second diagonal of the bridge circuit, its primary winding being connected between the two wires of a two wire cable. The incoming carrier signal is unmodulated or is already amplitude modulated depending on whether the illustrated station is the first station lying at the end of a cable containing the carrier signal generator or whether it is situated closer to the central transmitting/receiving station.

The manner of operation of the cable transmission system described above is as follows. The carrier which is transmitted by way of the cable and is nearly 100% amplitude modulated in the individual stations is generated in the carrier frequency generator G. This modulation is based on the principle that the transformers generate a short-circuit of the cable on their secondary sides at the clock rate of the communication. Upon application of a positive voltage ("1") at the data input, the correspondingly poled diodes of the modulator are through-connected and thereby short-circuit the primary winding of the appertaining transformer. This short-circuit for the carrier signal transforms itself on the secondary side of the transformer and a nearly 100% amplitude modulation occurs. Ferrite core transformers are employed and have a high-pass filter characteristic so that the low frequency data signal is not transmitted onto the cable.

In the central transmitting/receiving station at the end of the cable, the level of the incoming amplitude-modulated communication signal is increased in the amplifier V and the binary communication is regained by way of a demodulator Dem having the threshold value circuit SW. The binary communication of one or more transmitting/receiving stations which can have a dc component is therefore transmitted only on two wires of a signal line by means of a 100% amplitude-modulated carrier frequency. Circuits for the selection of the best signal communication or, respectively, of the line are not required in the stationary or in the central transmitting/receiving stations, since one, more or all transmitting/receiving devices can simultaneously influence the one line depending on whether they happen to be receiving communications.

FIG. 3 is a schematic illustration of a radio system having the devices for the communication transmission. Stationary transmitting/receiving stations S/E (intermediate stations 1, 2, 3 . . .) effective in both route directions are arranged along the route at prescribed intervals, the stationary transmitting/receiving stations S/E being connected by way of a cable K to the central station. Thereby each stationary transmitting/receiving station, i.e., each possible input location for a binary communication to be transmitted to the central transmitting/receiving station (central station), contains a modulation unit of the type illustrated in FIG. 1, at whose data input DE the received data arrive. The carrier frequency generator G is connected at the end of the cable farthest from the central station, therefore, in the first stationary transmitting/receiving station (the intermediate station 1).

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A radio system for communication transmission between transmitting/receiving stations located along a prescribed route of mobile transmitting/receiving stations, comprising:

a cable;

a plurality of stationary transmitting/receiving stations, including a central station, connected to said cable at prescribed locations along the route, with said central station connected to one end of said cable;

a carrier signal generator connected to the other end of said cable for applying an unmodulated carrier signal to said cable;

each of said stationary transmitting/receiving stations located between said central station and said carrier signal generator including a data driver including an input for receiving data and an output, an amplitude modulator connected to said output of said data driver, and a transformer including a primary winding connected to said amplitude modulator and a secondary winding connected in parallel across said cable; and said central station including a demodulator coupled to said cable, and a threshold value circuit connected to said demodulator and having a data output for said system.

2. The radio system of claim 1, and further comprising:

an amplifier connected between said cable and said demodulator.

3. The radio system of claim 1, and further comprising:

a plurality of time delay elements connected to the respective data drivers of said stationary transmitting/receiving stations located between said central station and the stationary transmitting/receiving station farthest from said central station, each of said time delay elements having a different time delay with the time delay increasing from the stationary transmitting/receiving station farthest from said central station to the stationary transmitting/receiving station nearest said central station.

4. The radio system of claim 1, wherein:

the transformation ratio of each of said transformers is at least five.

5. The radio system of claim 1, wherein:

the transformation ratio of each of said transformers is greater than five.

6. The radio system of claim 1, wherein each of said modulators comprises:

a diode bridge having first and second diagonals, one of said diagonals connected to receive data from said data driver and the other of said diagonals connected to said primary winding of the respective transformer.

7. The radio system of claim 1, wherein said cable is a two-wire cable.

* * * * *